Jan. 10, 1967  A. V. KISOVEC  3,297,094
AIRCRAFT PROPELLING ASSEMBLY
Filed Oct. 20, 1965  6 Sheets-Sheet 4
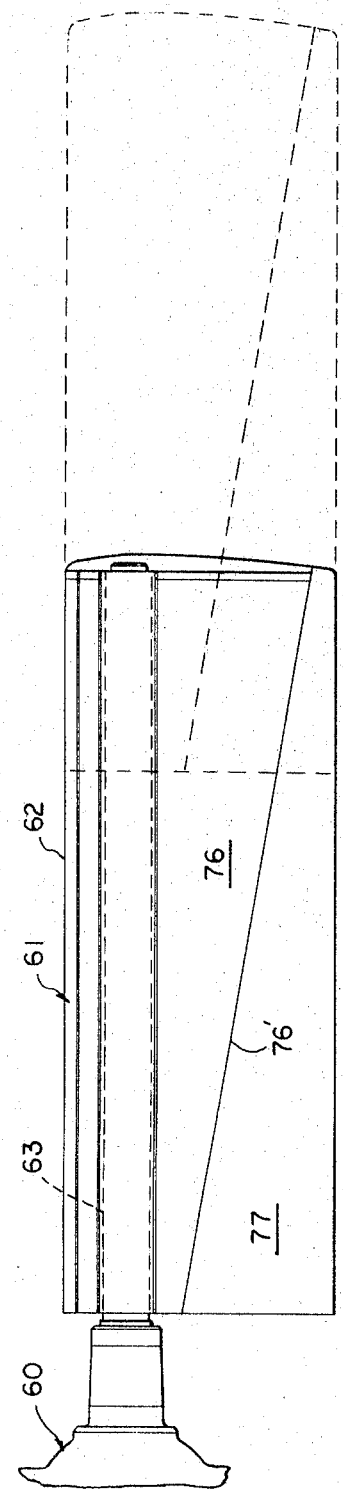
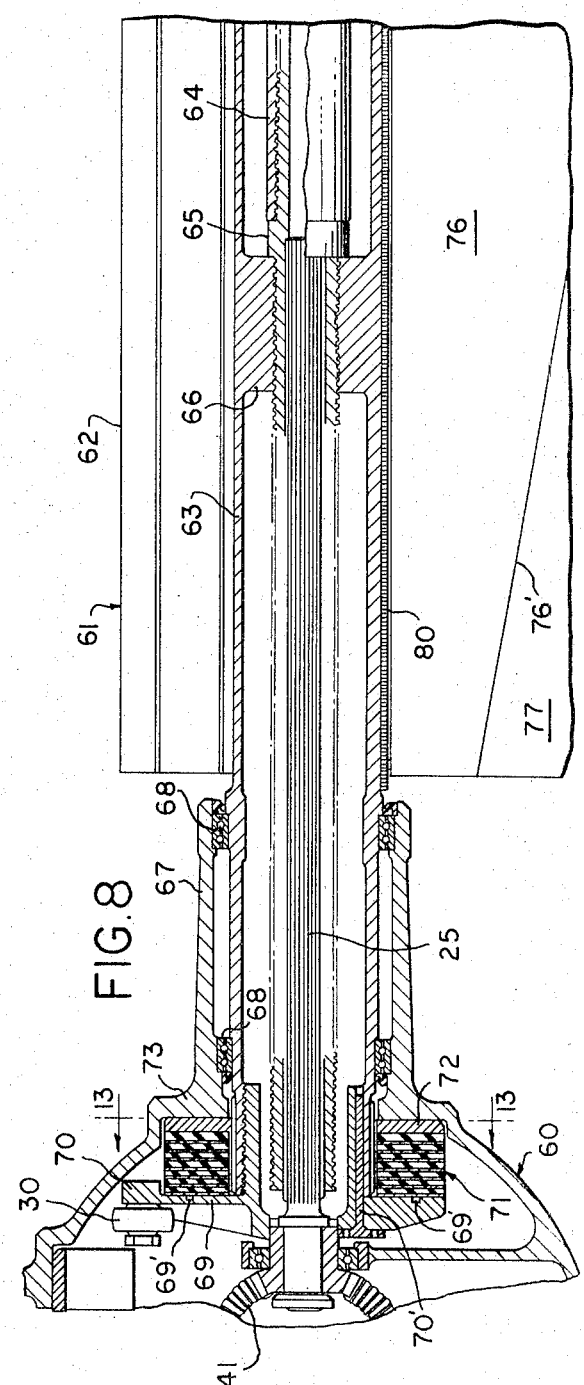
INVENTOR.
ADRIAN V. KISOVEC
HIS ATTORNEYS

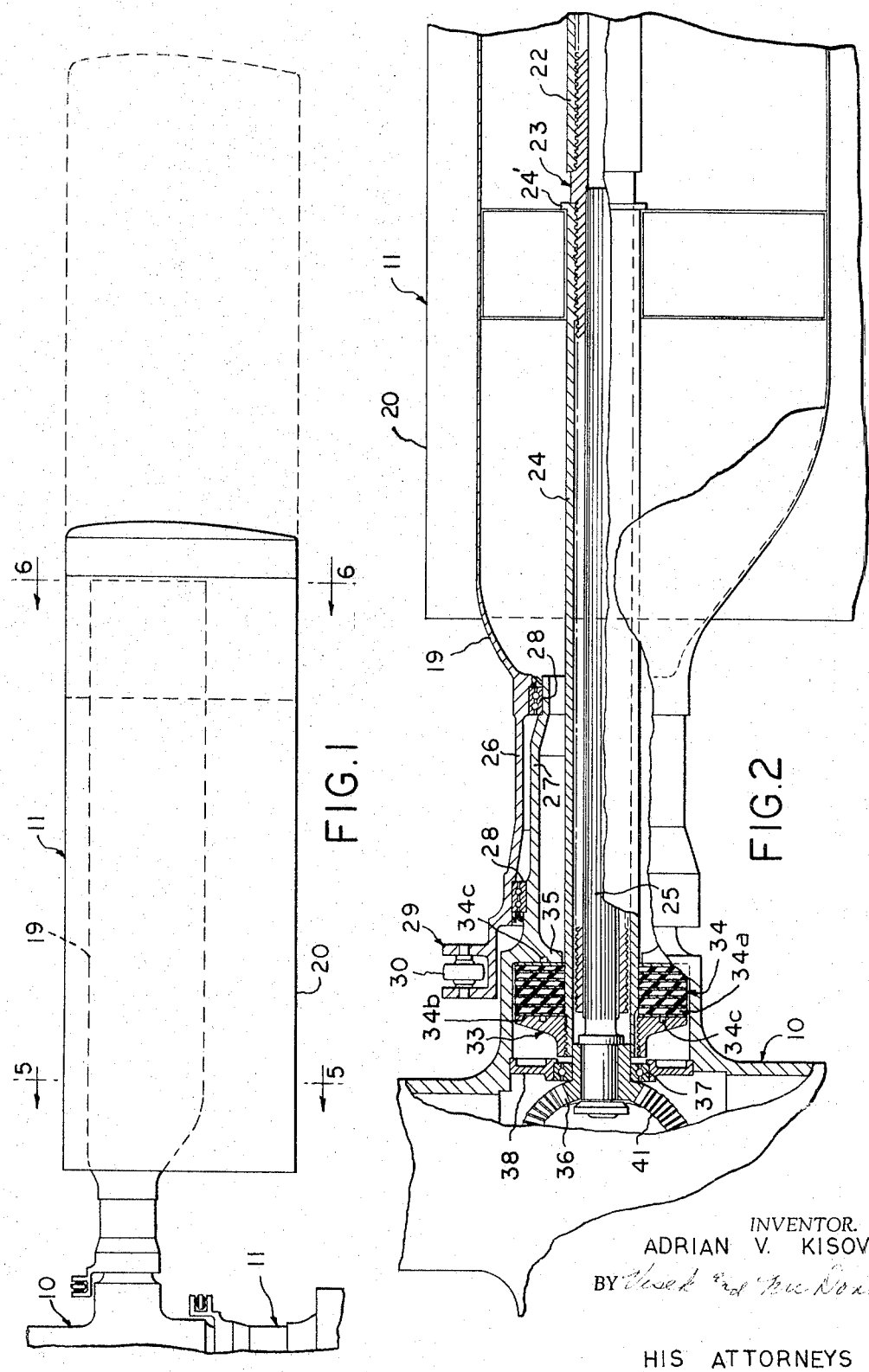

INVENTOR.
ADRIAN V. KISOVEC

BY

HIS ATTORNEYS

United States Patent Office 3,297,094
Patented Jan. 10, 1967

3,297,094
AIRCRAFT PROPELLING ASSEMBLY
Adrian V. Kisovec, Morton, Pa., assignor to The Boeing Company, Seattle, Wash., a corporation of Delaware
Filed Oct. 20, 1965, Ser. No. 498,278
15 Claims. (Cl. 170—160.11)

This invention relates to an aircraft propelling assembly and, more particularly, to an aircraft blade of variable radius.

In a convertiplane type of aircraft wherein the aircraft takes off and lands as a helicopter and flies as either a helicopter or as an airplane in forward flight at substantially greater speeds than a helicopter, there exists the problem of providing the desired thrust for both lift as a helicopter and high speed forward flight as an airplane. That is, when the convertiplane is functioning as a helicopter in landing or taking-off, a large force is required from the aircraft propelling assembly for lift in hover or at low velocity. When the convertiplane is to fly as an airplane at high speed, only a small force is required but a high velocity is needed. Accordingly, one prbolem in designing an aircraft propelling assembly for a convertiplane is to have the blades of the propelling assembly capable of providing both the large force in hover and at low velocity for landing and take-off and the small force at high velocity during flight as an airplane.

The present invention satisfactorily solves this problem by utilizing an aircraft blade of variable radius. Thus, when the convertiplane is landing or taking-off as a helicopter, the blades of the aircraft propelling assembly are extended to their maximum radius to provide the large force required to lift the convertiplane. When the convertiplane is ready for forward flight at high speed, the blades are shortened whereby a small force at a high velocity is imparted by the blades.

When an aircraft blade is used as both a rotor blade and a propeller, it is desirable that the blade have a larger twist when the blade is functioning as a propeller. The present invention satisfactorily solves this problem by utilizing in one embodiment an aircraft blade of variable length in which a twist is automatically imparted to the aircraft blade when it is in its retracted position and the twist is automatically removed when the blade is in its extended position. In another embodiment of the invention, the aircraft blade is designed so that the blade has a twist in its retracted position but there is no twist or little twist in the inner portion of the blade when it is in its extended position. By providing a twist in the aircraft blade in its retracted position wherein it functions as a propeller, a greater efficiency is obtained than if the blade was flat without any twist.

When an aircraft blade is used as both a propeller and a rotor blade, it must be capable of having its pitch changed either cyclically or collectively when it functions as a rotor blade. When functioning as a propeller, it is desirable not only to be able to change the pitch of the blade but also to be able to feather the blade. While elastomer bearings have been suggested for mounting rotor blades, these bearings are limited in the amount of deflection without failure or damage. Thus, the bearings have previously been incapable of use in blades requiring not only collective and cyclic changes but also feathering. The present invention satisfactorily overcomes this problem by employing an elastomer bearing in such a manner that the amount of deflection of the elastomer bearing is limited irrespective of the amount of rotation of the blade about its pitch axis.

Accordingly, an object of this invention is to provide an aircraft blade for use as both a propeller and a rotor blade.

Another object of this invention is to provide an aircraft blade of variable radius.

A further object of this invention is to provide an aircraft propelling assembly using elastomer bearings for mounting the blades of the assembly.

Still another object of this invention is to provide an aircraft blade having a variable twist that is dependent upon the radius of the aircraft blade.

Other objects of this invention will be readily perceived from the following description, claims, and drawings.

This invention relates to an aircraft propelling assembly comprising a hub, a blade including an inboard section and an outboard section, and means connecting the inboard section of the blade to the hub. Means move the outboard section with respect to the inboard section from a retracted position to an extended position and vice versa. The outboard section has a greater area than the inboard section.

This invention also relates to an aircraft propelling assembly comprising a hub, a blade including an inboard section and an outboard section, and means connecting the inboard section of the blade to the hub. Means move the outboard section with respect to the inboard section from a retracted position to an extended position and vice versa. The outboard section telescopes over the inboard section during movement between its retracted and extended positions.

This invention further relates to an aircraft propelling assembly comprising a hub adapted to be rotated, a blade, and means connecting the blade to the hub for rotation therewith. The connecting means includes an elastomer bearing to permit movement of the blade with respect to the hub. The elastomer bearing has one of its bearing surfaces contacting a portion of the hub and the other of its bearing surfaces contacting a portion of the blade. Means cause the same amount of rotation of the elastomer bearing as the amount of rotation of the blade about its pitch axis when the blade is rotated beyond a predetermined amount.

This invention still further relates to an aircraft propelling assembly comprising a hub adapted to be rotated, a blade including an inboard section and an outboard section, and means to connect the inboard section of the blade to the hub. Means move the outboard section with respect to the inboard section from a retracted position to an extended position and vice versa. The connecting means includes an elastomer bearing to permit movement of the blade in lead-lag and flapping planes with respect to the hub.

The attached drawings illustrate preferred embodiments of the invention, in which FIGURE 1 is a top plan view of an aircraft propelling assembly of the present invention with the blade in its retracted position in solid lines and in its extended position in dashed lines;

FIGURE 2 is an enlarged sectional view, partly in plan, of a portion of the structure of FIGURE 1 with the blade in its retracted position;

FIGURE 7 is a top plan view of another modification of the blade of the present invention with the blade in its retracted position in solid lines and in its extended position in dashed lines;

FIGURE 8 is an enlarged sectional view, partly in plan, of a portion of the structure of FIGURE 7 with the blade in its retracted position;

Figure 3:
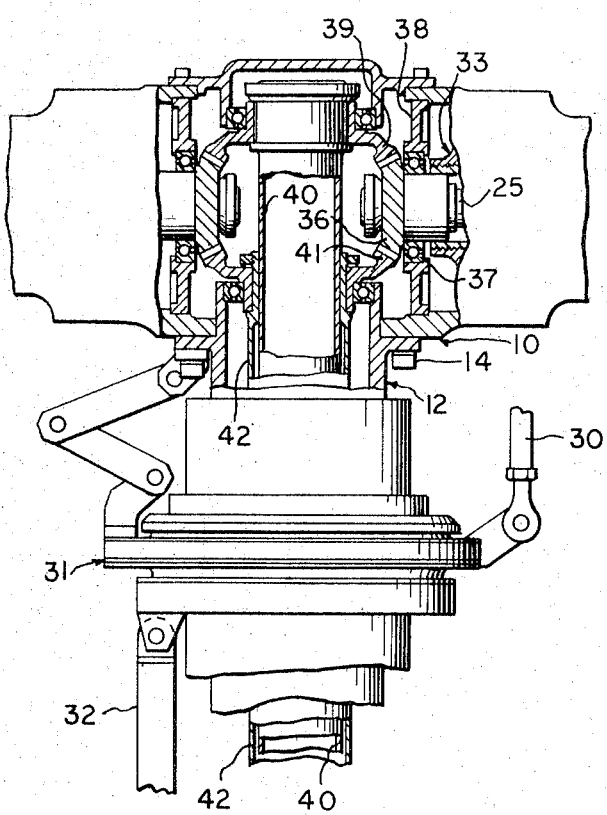
FIGURE 3 is an elevational view, partly in section, of an upper portion of the drive structure of the present invention.

Referring to the drawings and particularly FIGURES 1–6, there is shown a hub 10 having a plurality of blades 11 mounted thereon for rotation therewith. The hub 10 is secured to a drive shaft 12 (see FIGURE 3) by suitable means such as bolts 14, for example.

The drive shaft 12 is threadedly connected at its lower end to a shaft 15 (see FIGURE 4) having a gear 16 attached thereto. The gear 16 meshes with a gear 17 on an input shaft 18, which is connected to an engine or the like (not shown). Thus, whenever the input shaft 18 is rotated by the engine, the drive shaft 12 rotates to drive the hub 10 and the attached blades 11 in the well-known manner.

As shown in FIGURES 1 and 2, each of the blades 11 includes an inboard section 19 and an outboard section 20. The outboard section 20 has a greater area than the inboard section 19 of the blade 11. In its retracted position of FIGURES 1 and 2, the outboard section 20 is telescoped over the inboard section 19 of the blade 11.

Figure 5:
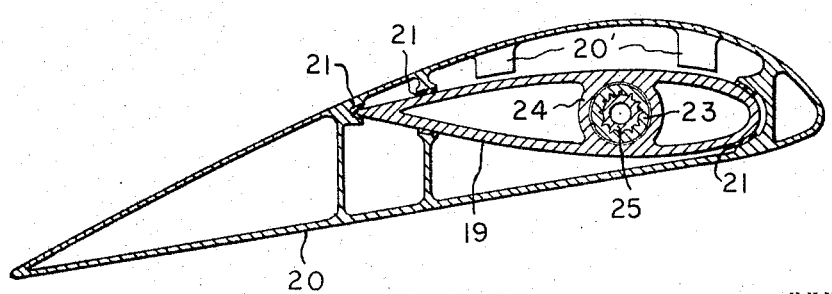
FIGURE 5 is a sectional view of the inner end of the blade in its retracted position and taken along line 5—5 of FIGURE 1.
Figure 4:
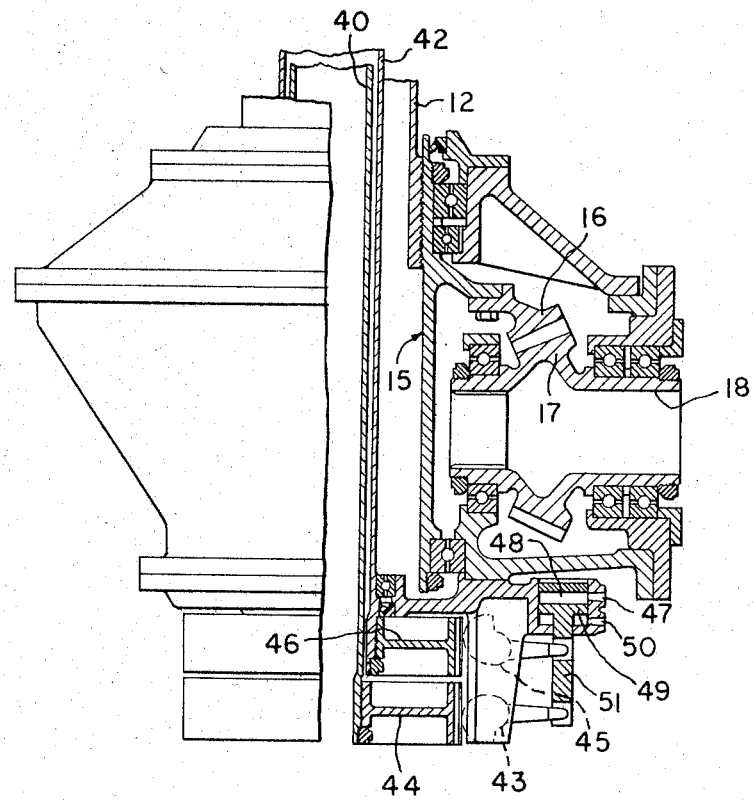
FIGURE 4 is an elevational view, partly in section, of a lower portion of the drive structure of the present invention.
Figure 6:
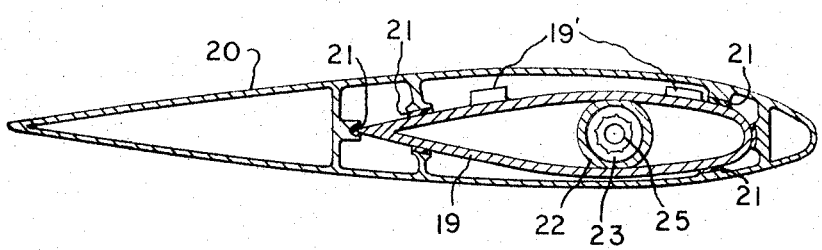
FIGURE 6 is a sectional view of the outer end of the blade in its retracted position and taken along line 6—6 of FIGURE 1.
Figure 9:
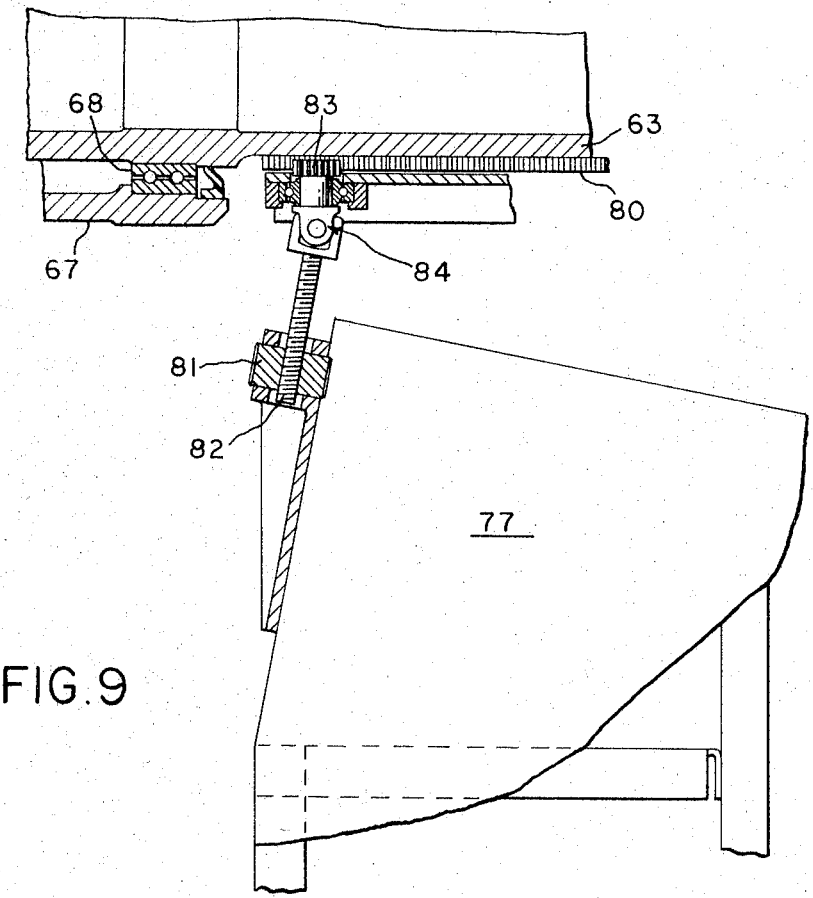
FIGURE 9 is an enlarged view of a portion of the structure of FIGURE 8.

As shown in FIGURES 5 and 6, the inboard section 19 is preferably formed without any camber or twist. However, the outboard section 20 is formed with a twist, which is a maximum at its root or inner end and zero at its tip.

The outboard section 20 slides in contact with both the leading and trailing edges of the inboard section 19. The outboard section 20 also contacts other areas of the inboard section 19 adjacent the leading and trailing edges of the inboard section 19. A material 21, which has a low coefficient of friction in the sliding direction, is secured to the inboard section 19 at these contact areas.

A hollow tube 22 is secured to the outboard section 20 adjacent its tip. The tube 22 extends inwardly within the inboard section 19. The hollow tube 22 has its internal surface threaded at its inner end for cooperation with threads on the exterior surface of a hollow telescoping screw 23. The threads on the internal surface of the tube 22 are formed for only a portion thereof so as to carry the centrifugal force loads of the outboard section 20 of the blade 11. The remainder of the internal surface of the hollow tube 22 is undercut to reduce friction on the threads of the telescoping screw 23.

The telescoping screw 23 also is threadedly connected with a hollow tube 24, which is secured to the inboard section 19 of the blade 11. It should be understood that the telescoping screw 23 has right hand threads cooperating with one of the tubes 22 and 24 and left hand threads cooperating with the other of the tubes.

The telescoping screw 23 is driven by a drive tube 25, which is mounted within the telescoping screw 23. The exterior surface of the drive tube 25 and the interior surface of the telescoping screw 23 are splined for cooperation with each other whereby the telescoping screw 23 may be moved radially with respect to the drive tube 25 and still have torque from the drive tube 25 transmitted thereto.

The inboard section 19 of the blade 11 has a reduced portion 26, which functions as a pitch housing, surrounding a reduced portion 27 of the hub 10. Because of bearings 28, which are disposed between the reduced portion 26 of the inboard section 19 and the reduced portion 27 of the hub 10, the blade 11 may be rotated with respect to the hub 10 about its pitch axis, which is the axis of the reduced portion 26 of the inboard section 19.

The innermost end of the reduced portion 26 of the inboard section 19 has a pitch arm 29, which is a pair of spaced brackets, extending therefrom. One end of a pitch link 30 is pivotally connected to the pitch arm 29. The other end of the pitch link 30 is connected to a rotative portion of a swashplate 31 (see FIGURE 3), which has both rotative and non-rotative portions in the well-known manner. Each of the blades 11 has a separate pitch link connected thereto in the same manner as shown and described for the pitch link 30.

The swashplate 31 may be moved longitudinally with respect to the axis of the drive shaft 12. When this occurs, the pitch of each of the blades 11 is collectively changed. The swashplate 31 also may be tilted so that cyclic pitch may be imparted to each of the blades 11 through the pitch link.

A plurality of control rods (one shown at 32 in FIGURE 3) is connected to the non-rotative portion of the swashplate 31. The movement of these control rods, which are connected to the pilot's control sticks, determines the collective and cyclic pitch imparted to the blades 11.

The innermost end of the hollow tube 24 is threadedly connected to a thrust plate 33 and held in locking arrangement therewith by a key. An elastomer bearing 34 is disposed between the thrust plate 33 and a shoulder 35 of the hub 10. The elastomer bearing 34 is preferably formed of a plurality of resilient elements 34a of rubber or the like with a plurality of plates 34b of metal or other suitable non-extensible material disposed therebetween and bonded thereto.

Studs 34c extend from the outer metal plates 34b of the bearing 34 into passages in the thrust plate 33 and the shoulder 35 of the hub 10. These prevent the elastomer bearing 34 from slipping with respect to either the thrust plate 33 or the hub 10 during pitch change of the blade 11.

The innermost end of the splined drive tube 25 has a bevel pinion gear 36 keyed thereto. The gear 36 is supported by a radial-thrust bearing 37, which is supported within a bearing housing 38 that is attached to the hub 10.

The gear 36 meshes with a gear 39 (see FIGURE 3) on an inner concentric tube 40 and a gear 41 on an outer concentric tube 42. The tubes 40 and 42 are free to rotate with the drive shaft 12. As long as both of the tubes 40 and 42 rotate, the drive tube 25 is not driven in either direction. However, if either of the drive tubes 40 and 42 is prevented from rotating, then the drive tube 25 will be driven.

Restraining the concentric tube 40 from rotating results in the drive tube 25 rotating in one direction. When the telescoping screw 23 has right hand threads cooperating with the hollow tube 24 and left hand threads cooperating with the hollow tube 22 and the rotor rotates counterclockwise, stopping rotation of the concentric tube 40 results in the telescoping screw 23 being driven in a direction to extend the outboard section 20 of the blade 11 with respect to the inboard section 19. Restraining the outer concentric tube 42 from rotating results in the drive tube 25 being rotated in the opposite direction whereby the telescoping screw 23 is rotated in the opposite direction to retract the outboard section 20 of the blade 11 with respect to the inboard section 19.

Of course, if the telescoping screw 23 had left hand threads cooperating with the hollow tube 24 and right hand threads cooperating with the hollow tube 22, the tube 42 would be held to cause extension of the outboard section 20 and the tube 40 held to cause retraction. Likewise, if the rotor rotated clockwise, the results would be the opposite from those previously described.

The inner concentric tube 40 is held against rotation when a shoe 43 (see FIGURE 4) is moved into engagement with an annular member 44, which is threadedly connected to the lower portion of the tube 40. A similar shoe 45 restrains the outer concentric tube 42 from rotating when it is moved into engagement with an annular member 46, which is threadedly connected to the lower end of the outer concentric tube 42.

The shoe 43 is moved into engagement with the member 44 of the tube 40 when fluid is supplied through a port 47 to the upper end of a cylinder 48 to move a piston 49 downwardly. As the piston 49 moves downwardly, fluid leaves the lower portion of the cylinder 48 through a port 50.

The piston 49 has a stem 51 extending from its lower end. The shoe 43 is pivotally connected to the lowermost end of the stem 51. Thus, when the piston 49 is moved downwardly, the shoe 43 is moved into engagement with the member 44 of the tube 40 to stop rotation of the tube 40.

When the piston 49 is moved upwardly within the cylinder 48 by supplying fluid throuhg the port 50 to the lower end of the cylinder 48 and removing it from the upper end of the cylinder 48 through the port 47, the shoe 45, which is pivotally connected to the stem 51 of the piston 49 above the connection of the shoe 43, is moved into engagement with the member 46 of the tube 42. As a result, the tube 42 is prevented from rotating whereby the telescoping screw 23 is driven in the opposite direction from when the tube 40 is prevented from rotating.

Considering the operation of the embodiment of FIGURES 1-6, the outboard section 20 of the blade 11 is disposed in the solid line position of FIGURE 1 wherein it is in the retracted position with respect to the inboard section 19 of the blade 11 when it is desired to fly the convertiplane as an airplane in forward flight. Thus, in order to take off, it is necessary to extend the outboard section 20 of the blade 11 by rotating the telescoping screw 23.

Because each of the blades 11 is similarly connected, all of the blades 11 have been outboard sections 20 extended simultaneously at the same rate because the drive tubes 25 of all of the blades 11 have their gears 36 meshing with the gears 39 and 41. In order to extend the outboard section 20 with respect to the inboard section 19, it is necessary to move the piston 49 downwardly whereby the tube 40 is prevented from rotating so that the outboard section 20 will extend with respect to the inboard section 19. Outward movement of the outboard section 20 with respect to the inboard section 19 is limited by engagement of parts 20' on the outboard section 20 with flanges 19' on the inboard section 19. The extended position of the outboard section 20 is shown in dashed lines in FIGURE 1.

Any cyclic or collective pitch changes to the blades 11 are imparted thereto through the pitch links (one shown at 30). These result in movement of both the inboard section 19 and the outboard section 20 of the blade 11 about its pitch axis.

After the convertiplane has reached a sufficient altitude so that it may move forwardly at a relatively high speed as an airplane, its wing is tilted from a vertical plane to a horizontal plane. When this occurs, a nacelle, which has the hub 10, the swashplate 31, and the drive shaft 12 mounted therein, also rotates since it is attached to the wing. As a result, the blade 11 is positioned to function as a propeller blade rather than as a rotor blade. When the blade 11 functions as a propeller blade, it is desirable that its radius be reduced.

Accordingly, the piston 49 is moved upwardly whereby the tube 42 is clamped against rotation by the shoe 45 so that the telescoping screw 23 is driven in the opposite direction to retract the outboard section 20 of the blade 11 with respect to the inboard section 19. As a result, the outboard section 20 moves inwardly over the inboard section 19 until it reaches the solid line position of FIGURE 1. When this occurs, a flange 24' on the inboard section 19 engages an enlarged portion, which separates the right and left hand threads on the telescoping screw 23, to prevent further inward or retracting movement of the outboard section 20 with respect to the inboard section 19. At this time, the piston 49 is returned to the position of FIGURE 4 wherein neither of the shoes 43 and 45 is held in clamping relation.

When the outboard section 20 is in its retracted position, its maximum twist is at its innermost end while it has no twist at its tip. In this arrangement, a twist is provided when the blade 11 functions as a propeller blade. However, when the blade 11 is functioning as a rotor blade, the inboard section 19 has a smooth aerodynamic surface without any camber or twist so that there is substantially no twist or other aerodynamic disturbance in the area adjacent the hub 10 when the blade 11 is functioning as a rotor blade. There is still a twist in the outboard section 20 but this is disposed in its extended position.

Referring to FIGURES 7-13, there is shown another modification of the present invention wherein a hub 60 is driven in the same manner as the hub 10. The hub 60 has a plurality of blades 61 (one shown) attached thereto for rotation therewith.

The blade 61 includes an outboard section 62 and an inboard section 63. The outboard section 62 has a greater area than the inboard section 63 and telescopes over the inboard section 63 when in its retracted position (solid line position of FIGURE 7).

The outboard section 62 has a hollow tube 64 secured thereto adjacent the tip of the outboard section 62. The hollow tube 64 has its internal surface threaded at its inner end for cooperation with threads on the exterior surface of a hollow telescoping screw 65. The length of the screws on the internal surface of the hollow tube 64 is sufficient to withstand all of the centrifugal forces generated by the outboard section 62 of the blade 61. The remainder of the internal surface of the hollow type tube 64 is undercut to reduce friction on the threads of the telescoping screw 65.

The telescoping screw 65 also has threads cooperating with threads on the internal surface of an annular portion 66 of the inboard section 63 of the blade 61. The remainder of the inboard section 63 of the blade 61 is hollow and has a substantially rectangular shape (see FIGURE 10). It should be understood that the telescoping screw 65 has right hand threads for cooperation with threads on either the inboard section 63 or the outboard section 62 and left hand threads for cooperation with threads on the other.

The telescoping screw 65 is rotated by the drive tube 25 in the same manner as the telescoping screw 23. The exterior surface of the drive tube 25 and the interior surface of the telescoping screw 65 are splined to permit the telescoping screw 65 to move radially with respect to the drive tube 25 whereby the outboard section 62 may be moved with respect to the inboard section 63 of the blade 61 while still receiving torque from the drive tube 25. As in the modification of FIGURES 1-6, the drive tube 25 is driven through the bevel gear arrangement.

The hub 60 has a reduced portion 67, which functions as pitch housing. Bearings 68 are disposed between the inbard section 63 of the blade 61 and the reduced portion 67 of the hub 60 to permit movement of the blade 61 about its pitch axis.

The innermost end of the inboard section 63 of the blade 61 is threadedly connected to a thrust plate 69, which has a pitch arm 70 formed thereon, and is secured thereto by a key 70'. The pitch link 30 is pivotally connected to the pitch arm 70 to rotate the blade 61 about its pitch axis, which is the axis of the drive tube 25 and the telescoping screw 65.

An elastomer bearing 71, which is preferably formed in the same manner as the elastomer bearing 34 of FIGURES 1–6, is preferably bonded to a thrust plate 72, which bears against a shoulder 73 of the hub 60. The thrust plate 72 is thus in frictional engagement with the shoulder 73. It is an aspect of this invention that the static frictional resistance between the thrust plate 72 and the shoulder 73 be greater than the resistance of the elastomer bearing 71 to deflect. A dry lube surface is provided between the thrust plate 72 and the shoulder 73 of the hub 60. The particular dry lube surface provided between the thrust plate 72 and the shoulder 73 may be any one of those commercially available which have a high static friction and a low dynamic friction. The other bearing surface of the elastomer bearing 71 has one of its metal plates contacting the thrust plate 69 and prevented from sliding relative thereto when the bearing 71 is deflected by studs 69' extending from the metal plate into passages in the thrust plate 69.

Figure 13:
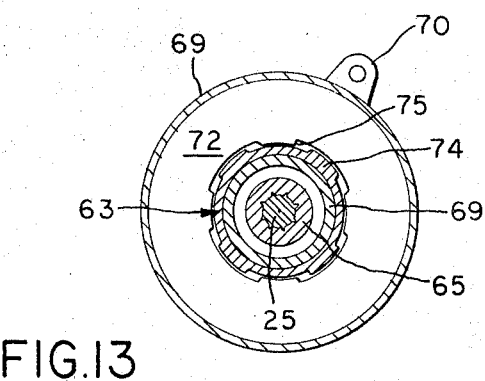
FIGURE 13 is a sectional view, partly in elevation, taken along the line 13—13 of FIGURE 8.

As shown in FIGURE 13, the inboard section 63 has splines 74 on its exterior surface for cooperation with splines 75 on the interior surface of the elastomer bearing 71 and the thrust plate 72. It should be understood that the cooperating splines will not engage until relative angular movement therebetween has occurred.

Thus, this spline arrangement permits deflection of the elastomer bearing 71 as the blade 61 is moved about its pitch axis in either direction of rotation due to any change in either cyclic or collective. However, when further rotation of the blade 61 is required due to feathering, the elastomer bearing 71 would be over deflected and damaged without the spline arrangement of FIGURE 13.

With the spline arrangement of FIGURE 13, the splines 74 and 75 engage when the blade 61 is rotated about its pitch axis beyond the point at which the elastomer bearing 71 would be over deflected. Engagement of the splines 74 and 75 results in the elastomer bearing 71 and the thrust plate 72, which is bonded to the elastomer bearing 71, rotating with the blade 61. The dry lube surface between the thrust bearing 72 and the shoulder 73 of the hub 60 reduces the friction during this forced rotation.

Thus, the blade 61 not only may be moved in cyclic and collective but it also may be feathered when required. It should be understood that all of the blades 61, which are attached to the hub 60, are feathered at the same time. It also should be understood that feathering occurs by arranging the swashplate 31 for sufficient longitudinal travel along the drive shaft 12. When feathering occurs, the pitch arm 70 is rotated approximately 90° counterclockwise from its position of FIGURE 13. Of course, the spacing of the splines 74 and 75 could be such as to result in the elastomer bearing 71 and the thrust plate 72 rotating with the blade 61 when any collective is required with maximum cyclic.

The outboard section 62 of the blade 61 is formed of a main section 76, which is a leading edge portion, and a flap 77, which is a trailing edge portion. The flap 77 is pivotally connected to the main section 76 by a hinge 78 (see FIGURE 10), which extends along the entire lower surface of both the main section 76 and the flap 77.

The hinge 78 has its axis extending at an angle with respect to the pitch axis of the blade 61 and is minutely inclined to upper aft edge 76' of the main section 76. The flap 77 has its surface 79 (see FIGURE 10), which is directly above the axis of the hinge 78, formed on a radius extending from the axis of the hinge to maintain a smooth contour with the upper surface of the main section 76 of the outboard section 62 as the flap 77 is pivoted about the hinge 78 from a position in which it forms a smooth continuation of the main section 76 to a position in which it is lowered with respect to the main section 76.

Figure 11:
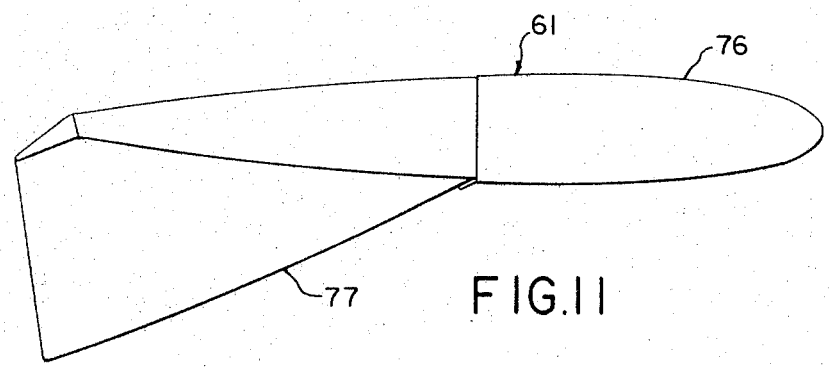
FIGURE 11 is a perspective view of the blade of FIGURE 7 in its retracted position and taken from its outer end.
Figure 12:
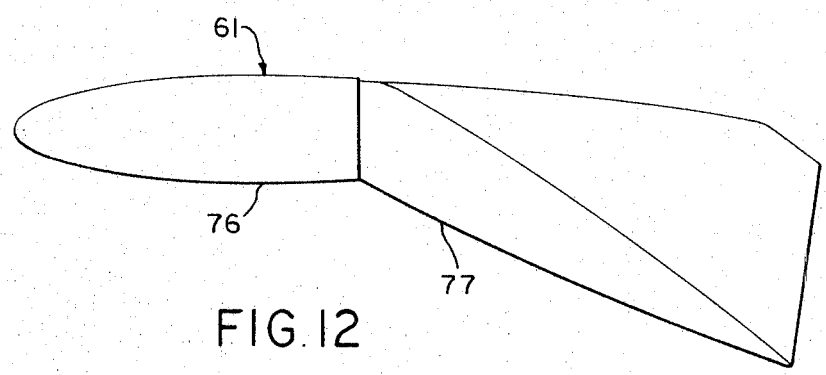
FIGURE 12 is a perspective view of the blade of FIGURE 7 in its retracted position and taken from its inner end.
Figure 10:
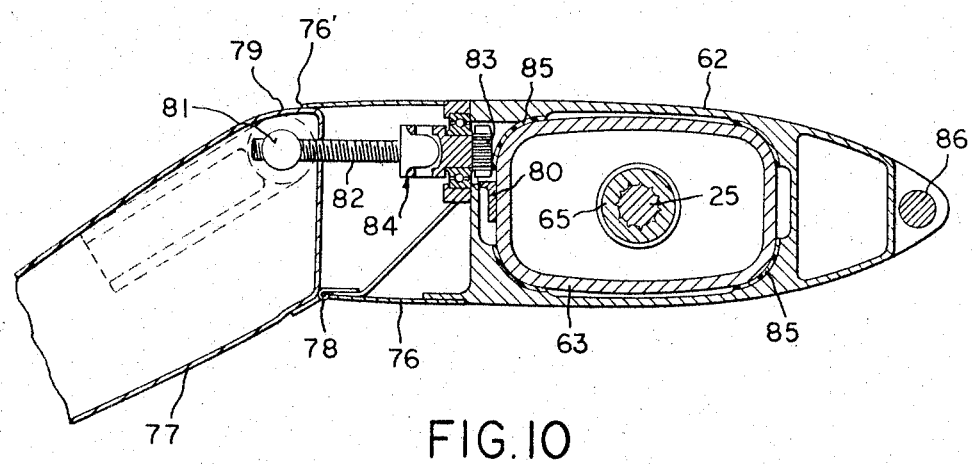
FIGURE 10 is a sectional view, partly in elevation, of a portion of the structure of FIGURE 9.

When the outboard section 62 is in its retracted position with respect to the inboard section 63 as shown in solid lines in FIGURE 7, the flap 77 is in its lowermost position with respect to the main section 76. Furthermore, as shown in FIGURES 11 and 12, the maximum amount of deflection of the flap 77 occurs at the innermost end while the minimum amount occurs at the tip because of the inclined relation of the axis of the hinge 78 with the pitch axis of the blade 61. As the outboard section 62 moves to its extended position (dashed lines of FIGURE 7), the flap 77 is moved so that it forms a smooth continuation of the main section 76 when the outboard section 62 is in its extended position.

The mechanism for automatically positioning the flap 77 includes a gear rack 80, which is attached to the aft portion of the inboard section 63 of the blade 61 and positioned within a recess formed in the main section 76. The rack 80 extends to the outer end of the inboard section 63.

The flap 77 has a trunnion 81 on its innermost end. A threaded worm 82 extends through the trunnion 81 and is connected to a gear 83 by a universal joint 84. The gear 83 mates with the gear rack 80.

Accordingly, as the outboard section 62 is extended with respect to the inboard section 63, the gear 83 moves along the gear rack 80 to rotate the worm 82. As a result, the flap 77 is pivoted about the hinge 78; it should be understood that the trunnion 81 is located an appropriate distance from the axis of the hinge 78 to cause this movement.

Thus, the flap 77 is automatically rotated or pivoted about the axis of the hinge 78 until it aligns with the main section 76 to form a blade without any twist. This occurs as the outer section 62 moves to its extended position (dashed lines of FIGURE 7). When the outer section 62 is retracted, the flap 77 is deflected whereby the blade 61 has a twist when the outboard section 62 is in its retracted position (solid lines of FIGURE 7), which is when the blade 61 functions as a propeller blade. This twist in the blade 61 results in a greater thrust being produced by the blade 61 when it functions as a propeller blade.

When the outboard section 62 is in its extended position wherein the blade 61 is functioning as a rotor blade, there is no deflection of the flap 77. Thus, the outboard section 62 has a smooth aerodynamic surface when in its extended position. It should be understood that the flap 77 could be mounted so as to be slightly deflected when the outer section 62 is in its extended position if desired.

A material 85, which has a low friction coefficient to sliding, is disposed between the inboard section 63 and the outboard section 62 whenever there is contact between the two sections during movement of the outboard section 62 with respect to the inboard section 63. This allows the outboard section 62 to readily move with respect to the inboard section 63.

The main section 76 has a rod 86 in its nose. The rod 86 functions as a balance weight for the blade 61.

Considering the operation of the modification of FIGURES 7–13, the hub 60 is rotated in the same manner as the hub 10. When the convertiplane is taking off, it is necessary for the blade 61 to have its maximum radius. Accordingly, the drive tube 25 is rotated to cause rotation of the telescoping screw 65 whereby the outboard section 62 moves to its extended position with respect to the inboard section 63. It should be understood that the drive tube 25 is driven by clamping one of the tubes 40 and 42 in the same manner as previously described with respect to the modification of FIGURES 1–6.

During movement of the outboard section 62 to its extended position, the flap 77 is pivoted about the hinge 78 through cooperation of the gear rack 80 and the gear 83. When the outboard section 62 reaches its extended position, the flap 77 is in a position wherein it forms a smooth continuation of the main section 76 rather than being deflected with respect thereto.

It should be understood that the hub 60 and the cooperating parts are mounted within a nacelle of the wing of the convertiplane. The wing is disposed in a vertical plane when the convertiplane is taking off.

After the convertiplane has reached sufficient altitude so that it may fly forward as an airplane, the wing is pivoted from the vertical plane to the horizontal plane. This moves the axis of the hub 60 from a vertical position to a horizontal position.

When the wing of the convertiplane is pivoted, the outboard section 62 of the blade 61 is moved to its retracted position (solid lines of FIGURE 7). When this occurs, the flap 77 is deflected with respect to the main section 76 of the outboard section 62 to create a twist when the blade 61 is functioning as a propeller blade. This deflection of the flap 77 occurs automatically and varies in accordance with the position of the outboard section 62 with respect to the inboard section 61. That is, the twist increases as the outboard section 62 moves to its retracted position from its extended position until the twist is a maximum when the outboard section 62 is at its retracted position. Furthermore, the twist is greater at the root end than the tip when the flap 77 is in its maximum deflected position.

It should be understood that suitable cooperating parts (not shown), which may be similar to the flanges 19′ and the parts 20′ of FIGURES 5 and 6, on the outboard section 62 and the inboard section 63 limit outward movement of the outboard section 62 with respect to the inboard section 63. Similarly, the enlarged portion of the telescoping screw 65 engages the annular portion 66 of the inboard section 63 to limit inward movement of the outboard section 62 with respect to the inboard section 63.

Any changes of cyclic or collective pitch during takeoff or landing of the convertiplane is accomplished through the pitch links (one shown at 30). Similarly, any change in collective pitch of the blades when the convertiplane is flying as an airplane is accomplished through the pitch links.

Furthermore, with the splines 74 and 75 cooperating with each other, the blades 61 may be feathered through operation of the pitch links if this is necessary. As previously mentioned, the splines 74 and 75 are designed to permit the elastomer bearing 71 and the thrust plate 72 to be deflected for cyclic or collective pitch in either direction about the pitch axis of the blade 61. However, the splines 74 and 75 engage when rotation of the blade 61 exceeds the requirements for cyclic and collective pitch in either direction. This occurs when feathering is desired because it is necessary to rotate or pivot the blade 61 approximately 90° about its pitch axis. While the splines 74 and 75 have been shown used with only the modification of FIGURES 7–13, it should be understood that the same type of arrangement could be employed with the modification of FIGURES 1–6 to permit feathering of the blades 11.

While the aircraft propeller assembly of the present invention has been shown as having four of the blades, it should be understood that any number of blades greater than one may be employed. While each of the blades has been shown as being connected through an elastomer bearing to the hub, it should be understood that the variable radius blade of the present invention could be employed in a structure using a mounting construction other than an elastomer bearing if desired. Likewise, the splined arrangement of the elastomer bearing may be used with blades of fixed radii if desired.

An advantage of this invention is that a twist of the aircraft blade, which functions as both a rotor blade and a propeller blade, is automatically provided when the blade is functioning as a propeller blade. Another advantage of this invention is that the radius of the blade is decreased when it is used as a propeller blade and increased when it is used as a rotor blade to obtain increased efficiency of the aircraft propelling assembly. A further advantage of this invention is that excessive deflection of the elastomer bearing is prevented when blade feathering is desired with the blades functioning as propeller blades.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. An aircraft propelling assembly comprising a hub adapted to be rotated, a blade, means connecting said blade to said hub for rotation therewith, said connecting means including an elastomer bearing to permit movement of said blade with respect to said hub, said elastomer bearing having one of its bearing surfaces contacting a portion of said hub and the other of its bearing surfaces contacting a portion of said blade, means to deflect said elastomer bearing when said blade is rotated about its pitch axis and means to limit the deflection of said elastomer bearing irrespective of the amount of rotation of the blade about its pitch axis.

2. An aircraft propelling assembly comprising a hub adapted to be rotated, a blade, means connecting said blade to said hub for rotation therewith, said connecting means including an elastomer bearing to permit movement of said blade with respect to said hub, said elastomer bearing having one of its bearing surfaces contacting a portion of said hub and the other of its bearing surfaces contacting a portion of said blade, means to deflect said elastomer bearing when said blade is rotated about its pitch axis, and said elastomer bearing and said blade having cooperating splined surfaces to limit the deflection of said elastomer bearing irrespective of the amount of rotation of the blade about its pitch axis.

3. An aircraft propelling assembly comprising a hub, a blade including an inboard section and an outboard section, means connecting said inboard section to said hub, means to move said outboard section with respect to said inboard section from a retracted position to an extended position and vice versa, said connecting means including an elastomer bearing to absorb centrifugal forces on said blade, said elastomer bearing having one of its bearing surfaces contacting a portion of said hub and the other of its bearing surfaces contacting a portion of said inboard section of said blade, means to deflect said elastomer bearing when said blade is rotated about its pitch axis and means to limit the deflection of said elastomer bearing irrespective of the amount of rotation of said blade about its pitch axis.

4. An aircraft propelling assembly comprising a hub, a blade including an inboard section and an outboard section, means connecting said inboard section to said hub, means to move said outboard section with respect to said inboard section from a retracted position to an extended position and vice versa, said connecting means including an elastomer bearing to absorb centrifugal forces on said blade, said elastomer bearing having one of its bearing surfaces contacting a portion of said hub and the other of its bearing surfaces contacting a portion of said inboard section of said blade, means to deflect said elastomer bearing when said blade is rotated about its pitch axis and said elastomer bearing and said inboard section having cooperating splined surfaces to limit the deflection of said elastomer bearing irrespective of the amount of rotation of said blade about its pitch axis.

5. An aircraft propelling assembly comprising a hub, a blade including an inboard section and an outboard section, means connecting said inboard section to said hub, means to move said outboard section with respect to said inboard section from a retracted position to an extended position and vice versa, said connecting means including an elastomer bearing to absorb centrifugal forces on said blade, and said outboard section having means to automatically cause an increase in effective twist of said blade as said outboard section is moved to its retracted position and a decrease in effective twist of said blade as said outboard section is moved to its extended position.

6. An aircraft propelling assembly comprising a hub, a blade including an inboard section and an outboard section, means connecting said inboard section to said hub, means connected to said inboard section and to said outboard section to move said outboard section with respect to said inboard section from a retracted position to an extended position and vice versa, and said outboard section having means to automatically cause an increase in effective twist of said blade as said outboard section is moved to its retracted position and a decrease in effective twist of said blade as said outboard section is moved to its extended position.

7. An aircraft propelling assembly comprising a hub, a blade including an inboard section and an outboard section, means connecting said inboard section to said hub, means to move said outboard section with respect to said inboard section from a retracted position to an extended position and vice versa, said moving means including a telescoping screw threadedly connected to both said inboard section and said outboard section and means to rotate said telescoping screw to cause relative movement of said outboard section with respect to said inboard section, and said outboard section having means to automatically cause an increase in effective twist of said blade as said outboard section is moved to its retracted position and a decrease in effective twist of said blade as said outboard section is moved to its extended position.

8. An aircraft propelling assembly comprising a hub, a blade including an inboard section and an outboard section, means connecting said inboard section to said hub, means to move said outboard section with respect to said inboard section from a retracted position to an extended position and vice versa, said moving means including a telescoping screw threadedly connected to both said inboard section and said outboard section and means to rotate said telescoping screw to cause relative movement of said outboard section with respect to said inboard section, said connecting means including an elastomer bearing to absorb centrifugal forces on said blade, and said outboard section having means to automatically cause an increase in effective twist of said blade as said outboard section is moved to its retracted position and a decrease in effective twist of said blade as said outboard section is moved to its extended position.

9. An aircraft propelling assembly comprising a hub, a blade including an inboard section and an outboard section, means connecting said inboard section to said hub, means to move said outboard section with respect to said inboard section from a retracted position to an extended position and vice versa, said connecting means including an elastomer bearing to absorb centrifugal forces on said blade, said outboard section including a leading edge portion and a trailing edge portion, and means to move said trailing edge portion with respect to said leading edge portion during relative movement of said outboard section with respect to said inboard section.

10. An aircraft propelling assembly comprising a hub, a blade including an inboard section and an outboard section, means connecting said inboard section to said hub, means connected to said inboard section and to said outboard section to move said outboard section with respect to said inboard section from a retracted position to an extended position and vice versa, said outboard section including a leading edge portion and a trailing edge portion, and means to move said trailing edge portion with respect to said leading edge portion during relative movement of said outboard section with respect to said inboard section.

11. An aircraft propelling assembly comprising a hub, a blade including an inboard section and an outboard section, means connecting said inboard section to said hub, means to move said outboard section with respect to said inboard section from a retracted position to an extended position and vice versa, said moving means including a telescoping screw threadedly connected to both said inboard section and said outboard section and means to rotate said telescoping screw to cause relative movement of said outboard section with respect to said inboard section, said outboard section including a leading edge portion and a trailing edge portion, and means to move said trailing edge portion with respect to said leading edge portion during relative movement of said outboard section with respect to said inboard section.

12. An aircraft propelling assembly comprising a hub, a blade including an inboard section and an outboard section, means connecting said inboard section to said hub, means to move said outboard section with respect to said inboard section from a retracted position to an extended position and vice versa, said moving means including a telescoping screw threadedly connected to both said inboard section and said outboard section and means to rotate said telescoping screw to cause relative movement of said outboard section with respect to said inboard section, said connecting means including an elastomer bearing to absorb centrifugal forces on said blade, said outboard section including a leading edge portion and a trailing edge portion, and means to move said trailing edge portion with respect to said leading edge portion during relative movement of said outboard section with respect to said inboard section.

13. An aircraft propelling assembly comprising a hub, a blade including an inboard section and an outboard section, means connecting said inboard section to said hub, means to move said outboard section with respect to said inboard section from a retracted position to an extended position and vice versa, said connecting means including an elastomer bearing to absorb centrifugal forces on said blade, said outboard section including a leading edge portion and a trailing edge portion, and hinge means connecting said trailing edge portion to said leading edge portion, said hinge means having its hinge axis extending at an angle to the pitch axis of said blade.

14. An aircraft propelling assembly comprising a hub, a blade including an inboard section and an outboard section, means connecting said inboard section to said hub, means connected to said inboard section and to said outboard section to move said outboard section with respect to said inboard section from a retracted position to an extended position and vice versa, said outboard section including a leading edge portion and a trailing edge portion, and hinge means connecting said trailing edge portion to said leading edge portion, said hinge means having its hinge axis extending at an angle to the pitch axis of said blade.

15. An aircraft propelling assembly comprising a hub, a blade including an inboard section and an outboard section, means connecting said inboard section to said hub, means to move said outboard section with respect to said inboard section from a retracted position to an extended position and vice versa, said moving means including a telescoping screw threadedly connected to both said inboard section and said outboard section and means to rotate said telescoping screw to cause relative movement of said outboard section with respect to said inboard section, said outboard section including a leading edge portion and a trailing edge portion, and hinge means connecting said trailing edge portion to said leading edge portion, said hinge means having its hinge axis extending at an angle to the pitch axis of said blade.

References Cited by the Examiner

UNITED STATES PATENTS

| | | | |
|---|---|---|---|
| 1,478,063 | 12/1923 | Schiesari | 170—160.11 |
| 2,145,413 | 1/1939 | Belfield | 170—160.11 |
| 2,163,482 | 6/1939 | Cameron | 170—160.11 |
| 2,585,468 | 2/1952 | Isacco | 170—160.55 X |
| 3,106,965 | 10/1963 | Gorndt, et al. | 170—160.53 |

FOREIGN PATENTS 799,235   3/1936   France.

EDGAR W. GEOGHEGAN, *Primary Examiner.*

EVERETTE A. POWELL, Jr., *Examiner.*